(12) United States Patent
Brown et al.

(10) Patent No.: US 6,476,743 B1
(45) Date of Patent: Nov. 5, 2002

(54) MAGNETIC STRIPE READER

(75) Inventors: Bradley Dale Brown, Winnipeg (CA); Shamir Nizar Mukhi, Winnipeg (CA)

(73) Assignee: Iders Incorporated, Winnipeg (CA)

( * ) Notice: Subject to any disclaimer, the term of this patent is extended or adjusted under 35 U.S.C. 154(b) by 0 days.

(21) Appl. No.: 09/959,884

(22) PCT Filed: May 11, 2000

(86) PCT No.: PCT/CA00/00543
§ 371 (c)(1),
(2), (4) Date: Nov. 9, 2001

(87) PCT Pub. No.: WO00/70534
PCT Pub. Date: Nov. 23, 2000

(51) Int. Cl.⁷ .................................................. H03M 5/00
(52) U.S. Cl. .......................... 341/123; 341/71; 341/132; 235/449; 360/43
(58) Field of Search ................................ 341/71, 72, 73, 341/123, 132; 360/43, 51, 52; 235/449

(56) References Cited

U.S. PATENT DOCUMENTS

| | | |
|---|---|---|
| 4,088,879 A | 5/1978 | Banka et al. |
| 4,141,494 A | 2/1979 | Fisher |
| 4,370,643 A * | 1/1983 | Kitamura .................... 341/123 |
| 4,442,347 A | 4/1984 | Hams |
| 4,486,653 A | 12/1984 | Powell |
| 4,529,872 A | 7/1985 | Dinges |
| 4,776,021 A | 10/1988 | Ho |
| 5,168,275 A | 12/1992 | Harrison et al |
| 5,559,317 A | 9/1996 | Wong et al. |
| 5,745,464 A * | 4/1998 | Taguchi et al. ................ 369/59 |
| 5,912,446 A | 6/1999 | Wong et al. |
| 6,388,596 B1 * | 5/2002 | Sandusky .................... 341/132 |

FOREIGN PATENT DOCUMENTS

| | | |
|---|---|---|
| JP | 55037636 A | 3/1980 |
| JP | 62154070 A | 7/1987 |

* cited by examiner

*Primary Examiner*—Howard L. Williams
(74) *Attorney, Agent, or Firm*—Adrian D. Battison; Michael R. Williams; Ryan W. Dupuis

(57) ABSTRACT

A method for decoding information contained in a waveform having a series of peaks is disclosed which is particularly directed to a method for reading a magnetic stripe for example on a card that allows the information on the stripe to be read without the need for unidirectional, single stroke swiping motion of the stripe. Features are disclosed that permit the accurate decoding of magnetic stripe data to define the bi-phase coded bits in the presence of signal degradations caused specifically, but not exclusively, by variations in the read speed including stop events and reversals. The method uses sampling of the waveform at a variable rate based upon the area of the waveform. The samples are used to locate peaks in the waveform, the profiles of which are then compared using various criteria with trained model peaks to classify the peaks into different types based upon the intersection between the different bits allowed under the bi-phase coding rules. The classified peaks are decoded into the bits and characters using confidence factors, windows of peaks, reverse gap closures and information from reversals to resolve areas of low confidence.

34 Claims, 8 Drawing Sheets

MAGNETIC STRIPE READER

This invention relates to a method for decoding information contained in a waveform having a series of peaks which is particularly but not exclusively directed to a method for reading a magnetic stripe that allows the information on the stripe to be read without the need for unidirectional, single stroke swiping motion of the stripe.

The embodiment as disclosed hereinafter which is directed to the primary but not exclusive function of decoding magnetic strip data includes features that permit the accurate decoding of magnetic stripe data in the presence of signal degradations caused specifically, but not exclusively, by variations in the read speed. The embodiment includes the capability to accurately decode stripe data even when the read motion includes stop events (0 read velocity) and reversals.

BACKGROUND OF THE INVENTION

Prior art US patents in this field are as follows:
U.S. Pat. No. 4,141,494 February 1979 Fisher
U.S. Pat. No. 5,168,275 December 1992 Harrison et al.
U.S. Pat. No. 4,529,872 July 1985 Dinges
U.S. Pat. No. 5,559,317 September 1996 Wong et al.
U.S. Pat. No. 5,912,446 June 1999 Wong et al.

Current magnetic stripe technology is based on F/2F coding (frequency/2 times frequency, also known as Aiken or biphase coding) in which the spatial frequency of flux reversals magnetically encoded on the stripe is used to represent binary information. Spatial frequency F represents a zero bit and spatial frequency 2F represents a one bit. Magnetic stripes are used in many applications, perhaps the most common being on credit or debit cards.

The reading of a magnetic stripe on a card in a situation where the stripe is not read at a suitable speed in a single direction has to date raised significant difficulties. While implementations have been created which operate over wider than typical dynamic ranges, little commercial success has been achieved and none of these implementations are capable of reading over a range of speeds including stop events. Typical magnetic stripe readers require read speeds in excess of 1.5 inches/second. This is particularly a problem where such magnetic stripes are read in a machine that can also read smart cards. Since the smart card reader typically requires a construction that precludes swiping of the card, two options are available. Two individual readers may be used (one for each card type); a solution that is sub-optimal with respect to the amount of space used and potentially confusing for an operator who has to decide which reader to insert a given card into. The other option is to use an insert style reader. Insert style readers, unless motorized, typically suffer low read speeds, card motion stop events and reversals as the card is inserted. A common mode of operation for an insert style combined magnetic stripe/smart card reader (a "hybrid" reader) is to request that the operator perform two different actions, depending on the card type being read. For a smart card, the card is inserted and left in place until the transaction is complete. For a magnetic stripe card, the card is first inserted and then immediately withdrawn. Reading of the magnetic stripe during withdrawal of the card tends to suffer from fewer problems of low card read speed or stops. The card reader is then able to make two read attempts and has a significantly higher probability of successfully reading the stripe. Unfortunately this mode of operation causes significant operator confusion, particularly given the fact that most smart cards also have magnetic stripes. Premature removal of a smart card (before the terminal has completed its communication with the card integrated circuit) can cause significant application problems.

Mechanical means to provide reliable magnetic stripe reads in a hybrid reader, other than using a motor for card transport, have been devised U.S. Pat. Nos. 4,529,872, 5,559,317, 5,912,446. All suffer from significant barriers to commercial success. In particular, they are not easily retrofitable into existing products due to significant mechanical differences from standard practice. They also require a number of precision mechanical components that are expensive to manufacture and assemble, and may lead to product reliability problems.

At least one prior art implementation, U.S. Pat. No. 4,141,494 to Fisher, attempts to deal with the large speed variations encountered when reading stripes moved past a read head by hand. The basic technique employed is to use a special read head to make the read head signal a function of the spatial frequency of the spatially encoded data on the stripe. A significant problem is, once again, changes required to standard practice for the read head making retrofitting to current implementations difficult. The technique also makes use of extensive analogue signal processing which is impractical at the extremely low frequencies encountered leading up to, or away from, a stripe motion stop event.

Prior art in U.S. Pat. No. 5,168,275 has attempted to minimize card read failures due to read signal degradation. While the system disclosed is capable of correcting read errors resulting from magnetic strip degradation, it is not capable of correcting errors caused by variations in read speed or direction. Most of the error correcting features disclosed are also limited to working in a system where the read speed is controlled (motorized reader).

SUMMARY OF THE INVENTION

One object of the invention is to provide a method and apparatus for reading data from magnetic stripes with F/2F encoded data.

It is another object of the present invention to provide a reader for a magnetic stripe that can accommodate read signal degradations caused by several factors, including large changes in read velocity as the stripe is moved past a standard inductive read head.

It is yet another object of the present invention to provide a method for digitally capturing the raw stripe read signals in both a memory and computationally efficient manner.

It is still another object of the present invention to provide a method that permits capture of all of the required magnetic stripe signal data in a single pass and also permits minimization of the amount of that data which must be stored at any given time.

These, and other objects, are provided by a method and apparatus for decoding F/2F signals in which samples of the F/2F data signal are repeatedly obtained and are converted into a series of digital values representing typically consistent integrated signal areas (+K or −K volt seconds). The signal area is integrated on a sample by sample basis by forming the integral of the current signal amplitude from which a signal offset has been subtracted. The signal offset is determined by a low pass filtered version of the read signal itself. The cut-off frequency of the filter is set lower than the product of the magnetic stripe encoding density (bits per inch) and the lowest possible stripe read speed (inches per second). The speed referred to is that speed which may be typically encountered in the specific mechanical arrangement associated with the reader (not including stop events). In a specific implementation, all digitally converted samples will either be of area +K or −K, or will be of a maximal time duration based on the limits of the digital representation of the sample duration. The sampled signal is thus converted into digital data that consists of a series of area-duration sample pairs in a novel analogue to digital conversion technique.

Those skilled in the art will recognize that integration of the read signal over a variable period represents filtering over a similarly variable bandwidth. As read speeds increase, the read signal amplitude increases causing the sample duration to decrease. The decrease in sample duration results in an increased filter signal bandwidth. Read signal levels are proportional to read speeds with a standard inductive head, leading to a filter signal bandwidth that exactly tracks the frequency of the read signal.

There is another useful aspect of the variable sample duration and its response to read signal level. With this technique more information is gathered from portions of the signal that contain large amounts of information (peaks), while little information is gathered from portions of the signal that contain little information (gaps between peaks or motion stop events). This aspect has a significant impact on both the computational efficiency and the memory storage requirements of an implementation that supports read speeds with a large dynamic range.

Those skilled in the art will also recognize that the adaptive filter bandwidth, together with the presence of noise, results in changes in the amplitude resolution of the resulting digital samples. Noise may be due to quantization, signal, or device noise. The end result is that the digital samples are of high resolution when the read signal amplitude is low (low read speed) and of lower resolution when the read signal amplitude is high (high read speed). The overall signal to quantization noise ratio is held constant by this mechanism over a large signal dynamic range.

According to another important feature of the invention, the area-duration sample pairs may then be processed in order to detect both the start of a magnetic stripe read and the occurrence of a motion stop event. When no read is being performed the ADC generates samples that are both of sub-threshold area (|area|<K) and of maximal duration. The start of a magnetic stripe read is detected through the consecutive occurrence of a predetermined number of samples (implementation specific) which are of less than maximal duration. Similarly, a motion stop event is detected through the consecutive occurrence of a predetermined number of samples (implementation specific) which are of maximal duration. After a read has started, the end of the read is determined either through the successful decoding of the entire magnetic stripe, or through detection of a motion stop event which persists beyond a predetermined time duration (may be determined through a specific number of maximal duration samples). Further processing is performed on area-duration samples that have been augmented with indications of the presence of stop events.

According to another important feature of the invention, read signal peaks corresponding to magnetic flux reversals imposed on the read head may be detected through processing of area-duration samples. Sequences of area-duration samples are delineated according to their polarity (positive or negative). A threshold for detection of a peak from these sequences is applied by discarding sequences that do not consist of at least a certain minimum number of samples M. Sequences that pass this test are then analyzed through consideration of all sub-sequences that are of some fraction (>=1/M) of the length of the entire sequence. The total duration of each of these sub-sequences is examined in order to find the sub-sequence with the shortest total duration. This sub-sequence is taken as being representative of the location of the peak and its amplitude. The fact that the shortest sub-sequence corresponds to the maximum in the amplitude of the read signal is a consequence of the ADC technique used. The centre of the sub-sequence in the time domain (half way through its duration) is taken as the time of the peak, while the total area represented by the sub-sequence divided by the total duration of the sub-sequence is taken as the amplitude of the peak. Peaks that do not exceed a specific magnitude are discarded.

Peaks of the same polarity that are separated by a stop event are merged together in order to handle the case where the read head is stopped in a position either directly above, or in the immediate vicinity of, a flux reversal. The number of samples in each sequence representing a peak is adapted at the start of a stripe read by adjusting the K parameter in the ADC. The area of each peak is approximately constant, resulting in the number of samples per peak being inversely proportional to K.

According to another important feature of the invention, various measurements are made of the characteristics of a detected peak. These measurements, called metrics, are calculated based on all of the samples of the sequence in which a peak was detected. These metrics, including for example the total area of the peak, are used to classify each peak into four classes. The classes are defined by the nearest neighbour relationships between the peak in question and the peaks preceding and following it. Peaks in the read signal are generated by flux reversals in an F/2F encoded stripe. There are four possible physical combinations of the immediate neighbourhood of a flux reversal. Each flux reversal is both preceded and followed by a flux reversal either one [F], or one half [2F], bit periods spatially distal. The permutations of these two inter flux reversal distances result in the four possible classes.

Classification of each peak is performed by comparing the match or fit between the metrics for the peak and those of a prototype for each of the four peak classes. The metrics are used with a weighting appropriate to the peak class being evaluated for a match as well as the proximity of stop events. Weighting of the metrics based on these factors facilitates emphasis of the most appropriate metrics in each of the possible cases. For example, metrics which become less reliable near stop events would be weighted less in the match computations for a peak in the vicinity of a stop event. The peak class prototypes are intialized based on a combination of a priori knowledge of the relationships between the metrics for each class, as well as information gathered from the first series of peaks of the stripe read which are known to be of class 0. The prototypes are then adaptively refined throughout the remainder of the read. The classification of each peak results in four confidence values, one for the confidence of a match with each class. Each time a peak is classified, the class prototype which best matches the peak is adapted (trained) to more closely match the metrics of the peak, as long as the confidence of this classification is above a certain threshold. The prototypes for the other classes are also adapted, but with targets calculated from both the peak metric values and the current interrelations between the best match class prototype and the class prototype being adapted.

Following a stop event, the class prototypes are typically poor representations of the peaks in the read signal due to sudden mechanical changes in the read head to magnetic stripe interface. In this event, a number of peaks may be classified with low confidence until the class prototypes become more representative of the actual characteristics of the peaks being read from the stripe. According to the invention, these incidences of low peak classification confidence are mitigated through a "peak reverse gap closure" procedure. Peaks after a stop event are classified until high confidence is obtained on at least a certain number of peak classifications. At this point the class prototypes, which are now representative of the characteristics of the four peak classes, are trained in reverse time sequence backwards through the peaks until the stop event is reached. Peak classification is then re-started from the start of a stop event moving forward in time with the class prototypes that are now good representations of the four peak classes.

According to another important feature of the invention is provided a method of classifying peaks in real time (during the stripe read) conserves memory resources. As peaks are classified with high confidence, their base data (area-duration samples, metric values, etc.) are discarded. When an area of low peak classification confidence is encountered, data required for further analysis is kept only until it is used for that further analysis (peak reverse gap closure, for instance), then it is discarded.

According to another important feature of the invention, classified peaks are decoded into bits using two different algorithms. The most computationally intensive is soft bit classification. Soft bit classification is performed by considering all possible legal sequences (according to F/2F coding rules) of peak classes over a specific window of peaks (3 peaks, for example). The process starts with the assumption that the first peak is on a bit boundary and uses the previously decoded bit value as a constraint. The actual sequence of peaks is considered through the creation of the sum of the confidences that each peak matches the corresponding peak class in the sequence. If, for example, the sequence under consideration was [1, 0, 2], the confidence that this was the best matching sequence would be the sum of the confidence that the first peak was of type 1, the second peak was of type 0, and the third peak was type 2. The confidence of a match with all possible sequences is computed, and the sequence with the highest confidence is selected.

A computationally efficient alternative to soft bit classification is a hard bit classification algorithm. In this algorithm peak classifications are made "hard" through simply assigning each peak a single class number corresponding to the class with the highest confidence. Matches with the actual peak class sequence are then evaluated by generating a hamming distance between the peak class sequence and all of the legal sequences. If a tie occurs between two or more different candidate sequences, then soft bit classification may be used to make the final selection.

The first bit value encoded by the selected best match sequence is selected as the decoded bit value. A confidence is also calculated for the decoded bit as a function of the confidences for each peak that makes up the decoded bit. Using the earlier example, assuming that the sequence was the best match, the decoded bit value would be a zero. The decoded bit confidence is a function of the confidence that the first peak is of type 1, and the confidence that the second peak is of type 0. After each bit is decoded, the window is moved forward by one bit (either one or two peaks depending on the value of the decoded bit).

According to another important feature of the invention, bit decoding may be performed in reverse time sequence after a stop event, or other signal impairment, in order to improve bit confidences. After a signal impairment, bit level confidences may drop to low values, even in areas where peak level confidences are high, if the bit level decoding loses synchronization with the encoded bit sequence. In this case, a "bit reverse gap closure" algorithm is applied. Bits are decoded, using one of the algorithms described earlier; analysis proceeds in reverse time sequence from an area of high bit level confidence until the area of the impairment is reached. A further aspect is that, after delineation of the low confidence region at the bit level, an adaptation to the bit classification algorithm may be used to advantage. The peaks in the low confidence region may be re-evaluated using the soft bit classification algorithm where only peak sequences which both start and end on a bit cell boundary are considered (referred to as "constrained bit classification"). The low confidence region defined at the bit level is used to identify the last confident bit boundary peak before the region (last peak of the last high confidence bit). Similarly, the first peak of the first high confidence bit after the low confidence region is used to identify the first confident bit boundary peak after the region. All legal peak class sequences equal in length to peak sequence in the low confidence region are then examined, with the additional constraint that only sequences both starting and ending on a bit boundary be considered.

According to another important feature of the invention, the decoded sequence of bit values may be divided into sub-sequences containing bits that have been decoded with high confidence. These sub-sequences are separated from each other by sub-sequences of bits that have been decoded with relatively low confidence. An examination of each of the high confidence bit sub-sequences is performed to identify the character level boundaries within the bit subsequence. Common magnetic stripe encoding standards (ABA, IATA) include the concept of a character that includes a character level parity bit. Given that all of the bits in the considered bit sub-sequence have been decoded with high confidence, only character alignments (one is possible per bit contained in the character) which satisfy the parity constraint are possible. By examining the legal character alignments in the bit sub-sequences before and after a low confidence sub-sequence (typically one per bit subsequence), a decoding error within the low confidence sub-sequence may be detected if the character alignment is not maintained across the region. The specific error detected is one of decoding either a greater or smaller number of bits than the correct number. In a manner similar to that described earlier for "constrained bit classification", the low confidence region may be re-classified where the peaks in the region are decoded with the further constraint that a known number of bits are to be decoded. This is soft bit classification over a window of peaks equal to the number of peaks in the low confidence region (including bit boundary peaks), where only legal sequences that code the required number of bits are considered.

When the motion of the stripe temporarily reverses during a read, the result is referred to as a reversal event. Bit sequences are analysed to detect reversal events. These events are detected in numerous of ways, including comparing a total number of bits obtained from the analysis with an expected total number of bits. When the former exceeds the latter, a reversal event has occurred. The determination that a reversal may have occurred may also be made and confirmed through the analysis of the reverse time correlation between bit strings before and after stop events that invariably separate the bit sequences read before and after the change of stripe direction. In a typical practical case, the motion of the stripe changes directions twice. The bit sequence read in-between the two stop events is a repeat, in reverse time order, of the end of the bit sequence leading into the first stop event. Likewise, it is also a repeat of the beginning of the bit sequence leading away from the second stop event. During a read in which the stripe is entirely moved passed the read head, a reversal of direction implies that some sequence of bits is being read not only once, but at least three times. This fact may be used to advantage in obtaining a higher confidence bit classification for these bits on the stripe through correlation of the information from the three read passes. Optionally, a means for determining strip position or direction may be used to detect the occurrence of a reversal event.

DETAILED DESCRIPTION OF THE PREFERRED EMBODIMENT

Figure 1:
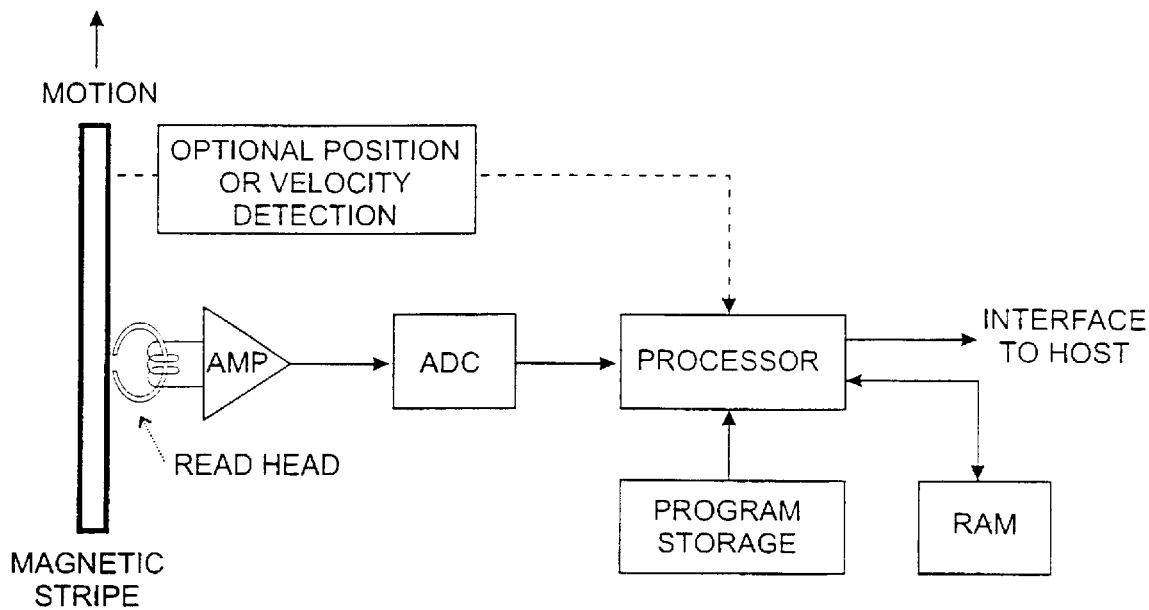
FIG. 1 illustrates a high level block diagram of the F/2F decoding system.

FIG. 1 illustrates, in block form, the preferred embodiment of the magnetic stripe reader. The magnetic read head generates an analogue voltage signal that results from changes in magnetisation along the stripe relative to the movement between the read head and the stripe. This signal is amplified by an amplifier. The analogue to digital converter (ADC) samples the amplified analogue voltage at a variable sampling rate and generates a stream of digital values. Digital samples are processed by a processor which can in turn provide information to a host system. The processor is controlled by a program stored in the program storage area, and data is written to and read from the random access memory (RAM). The processor may, optionally, use information provided by a position or velocity detector.

The ADC sampling rate is varied on the basis of characteristics of the analogue voltage. Specifically, the sampling rate is proportional to the amplitude of the signal as measured from its central base line (the DC average). The sampling rate is increased where the amplitude is higher and is reduced where the amplitude is lower. The sampling rate is selected such that the area obtained by multiplying the amplitude by the sample duration is substantially equal for all samples.

Figure 2:
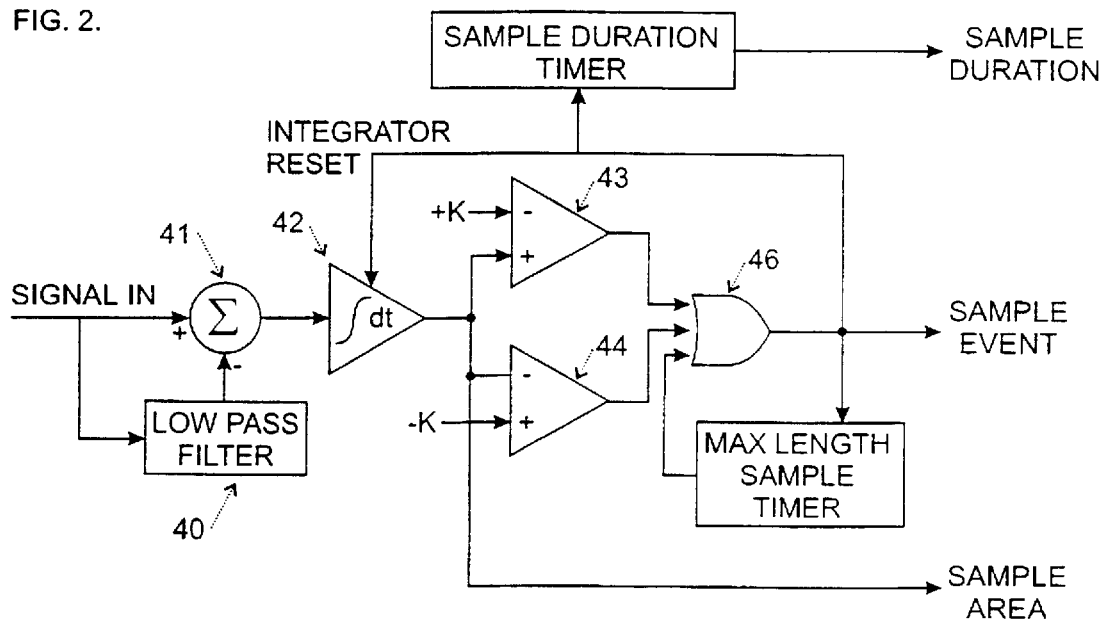
FIG. 2 illustrates a block diagram and signal flow graph for an analogue to digital converter.
Figure 3:
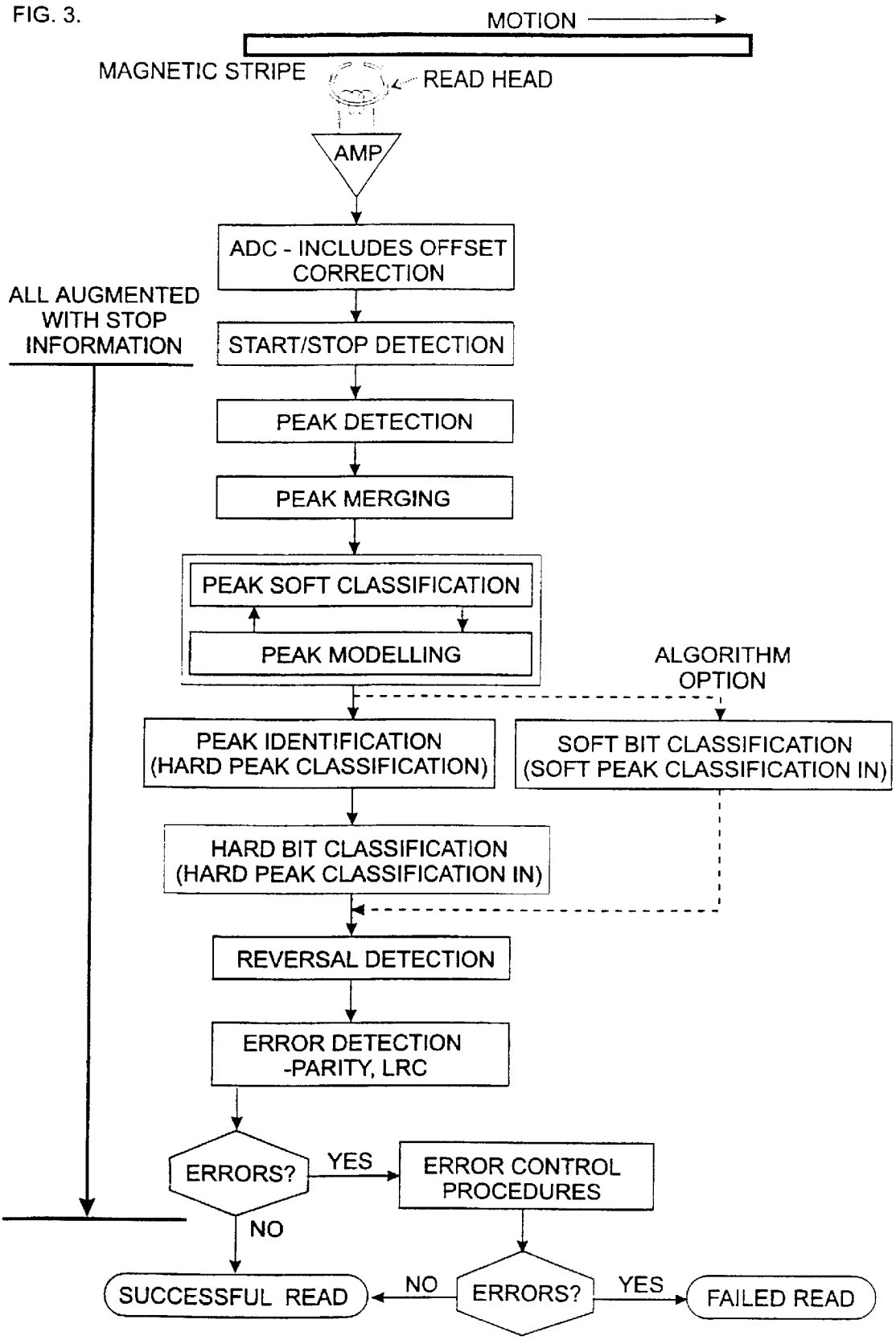
FIG. 3 illustrates a processing flow chart for the F/2F decoding system.

FIG. 2 illustrates a manner in which the ADC could be implemented. A low pass filtered version of the signal input is subtracted from the signal input by a subtractor 41. The cut-off frequency of the low pass filter is set to be below any signal frequencies expected from a stripe read signal. Note that the signal content from a standard inductive read head is purely AC. The result is that the -subtractor 41 generates an offset corrected version of the signal with any low frequency DC offsets due to amplifier offset etc. removed. Integrator 42 then integrates the offset corrected signal. When the integrator 42 output reaches either +K or −K, comparator 43 or 44 generates a sample event signal through the logical OR gate 46. The sample event signal resets the output of integrator 42 to zero. With this mechanism sample events are generated each time the integral of the offset corrected input signal reaches either +K or −K. The sample duration timer, typically a binary counter, tracks the time duration between each sample event. At the end of each sample event, the duration timer is reset to zero. The maximum length sample timer observes the period between sample events, and forces a sample event through OR gate 46 when the sample duration timer is at its maximum value. The action of the maximum length sample timer prevents the overflow of the sample duration timer.

Each time a sample event is generated, two digital values are captured at the output of the ADC. One is the sample duration, the other is the sample area. The only case where the sample area will not be either +K or −K is when the sample event was generated by the maximum length sample timer, in which case the sample duration will be at its maximum. Those skilled in the art will recognize that this ADC may be implemented in many ways. In particular boundaries between analogue and digital signal processing may be placed anywhere between the signal input and the ADC outputs of sample duration and area.

Figure 4:
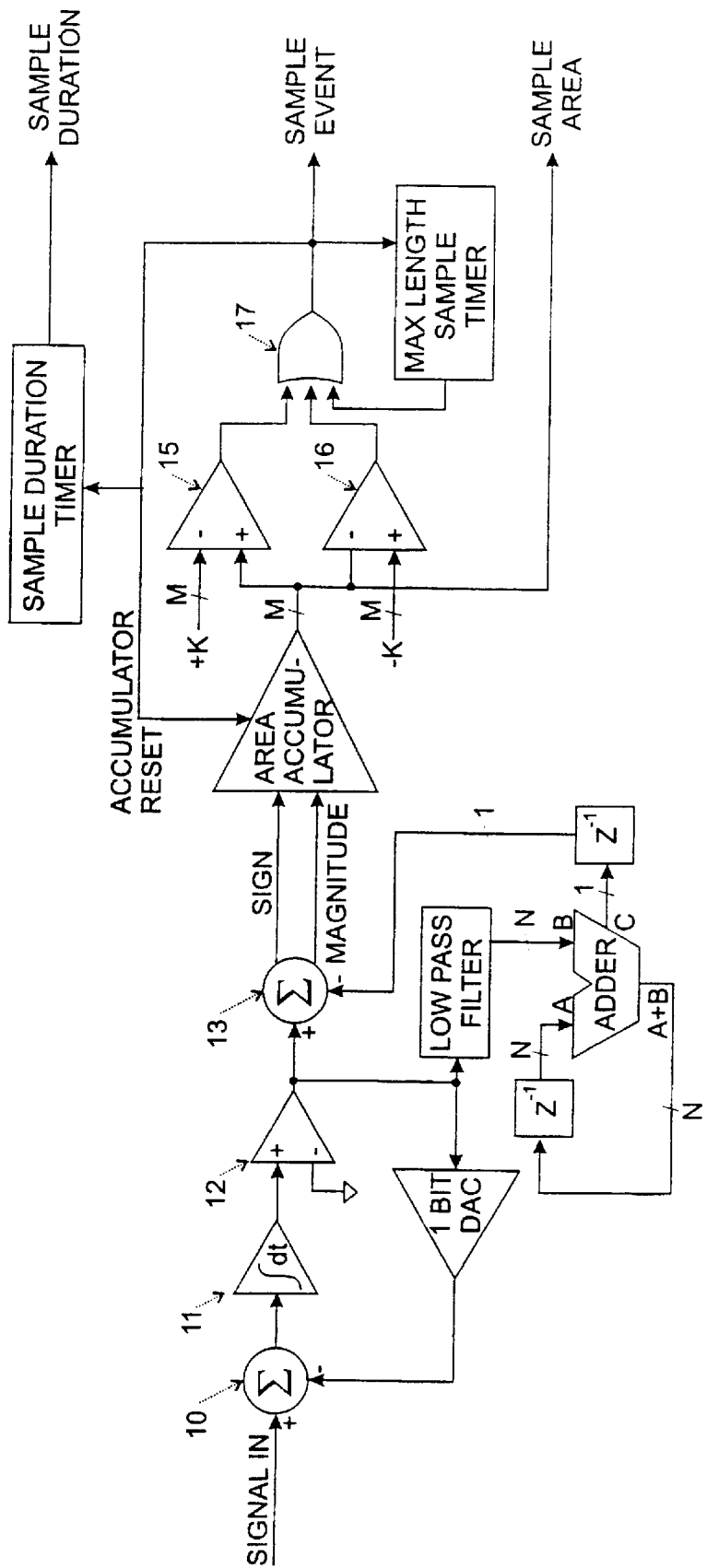
FIG. 4 illustrates the preferred embodiment of the analogue to digital converter.

FIG. 4 illustrates a particularly advantageous implementation of the ADC. Subtractor 10, integrator 11, comparator 12, and a one bit digital to analog converter (DAC) form a loop that those skilled in the art will recognize as a first order sigma-delta ADC. Through the use of a single bit sigma-delta converter, all of the signal processing illustrated in FIG. 2 may now be implemented digitally. The fact that the signal at the output of comparator 12 is coded in a single bit allows the digital hardware to be quite compact. Subtractor 13 is a single bit digital subtractor with a sign/magnitude format output. The low pass filter may be implemented using conventional digital filtering techniques. The output of the low pass filter, which represents the DC offset of the input signal, has N bits, many more than its single bit input signal. The low pass filter has a very large resolution due to its filtering having removed most of the quantization noise of the sigma-delta ADC. An N bit adder and register ($Z^{-1}$) are used form a delta sigma modulator in order to transform the N bit DC offset back into a single bit signal. The register ($Z^{-1}$) in the single bit signal path is for signal re-timing only. Transformation of the DC offset back into a single bit allows the use of the single bit subtractor 13 to generate the offset corrected version of the input signal. The offset corrected input signal, in sign/magnitude format, is fed into an area accumulator, implemented with a binary up/down counter. The area accumulator is a digital implementation of the integrator 42 in FIG. 2. The area accumulator has an M bit signed output that is compared against the desired sample areas of +K and −K. OR gate 17 in the preferred embodiment is directly analogous to the OR gate 46 in FIG. 2. The rest of the circuit operates exactly as described earlier for FIG. 2.

The preferred embodiment of the ADC facilitates construction of a hardware implementation that is very circuit area efficient. The use of single bit signals and processing hardware in many places, along with a cycle by cycle computation of the signal area is very efficient. Further improvements in hardware efficiency can by achieved by converting the area accumulator to a sign/magnitude coded format thus permitting a single output comparator to be used to determine when area exceeds K.

As a consequence of this sampling algorithm, and the use of a sigma-delta converter (1-bit ADC), the resolution of the digital samples collected vary with the amplitude of the input signal (AC content). Longer samples are taken of low amplitude (slow) peaks, resulting in higher bit resolution due to the rejection of more of the quantization noise of the sigma-delta ADC. This results in improved performance with low amplitudes that represent low magnetic stripe movement velocities. For the same reasons, high amplitude signals (high velocity movement) are sampled more often and at a lower bit resolution. In a traditional sigma-delta ADC architecture the analogue signal is over-sampled and then digitally filtered at a fixed decimation rate to provide a consistent stream of fixed resolution samples. The presented sampling algorithm takes advantage of the signal characteristics in a magnetic stripe reader (slow read speeds yield low signal amplitudes at low frequency, high read speeds yield high signal amplitude at high frequency) in two ways. One way is the automatic adaptation of the decimation rate in order to minimise the number of digital samples which need to be stored or processed. The other way is the automatic adaptation of the decimation filter characteristics in order to provide samples of a varying amplitude resolution and bandwidth that is appropriate for analysis of the signal present at the time.

The presence of maximum length samples (those for which the counter has rolled over) indicates that the stripe has stopped for a time relative to the head. By observing a predetermined number of samples that are maximal length (samples that represent signal volt x time areas which are below K), it can be determined that the stripe is moving slow enough to be considered stopped. Observing low speed stripe motion in the mechanical arrangement of the specific stripe reader allows setting this threshold. The differences between static and dynamic friction ("stiction") typically make it very difficult to move the stripe below a certain speed. Using this low speed threshold along with the magnetic stripe coding density allows a maximum time threshold between peaks to be determined. Dividing this time threshold by the time duration of a maximal length sample in a particular implementation sets a threshold for the number of maximal length samples which may be observed before the occurrence of a stop event should be declared. Detection of stop events is useful for analysis using peak models, character and coding analyses, and reverse gap closure to determine the bit sequence in the vicinity of the event.

In the application of an area based ADC algorithm to sampling of the magnetic stripe reader head signal, an adaptation of the value of K may be applied. During the start of the stripe read a synchronisation pattern (representing all zero bits) is present on the stripe. In order to properly decode the stripe it is important to have enough samples of the signal. Having too many samples, however, may overburden the memory and processing resources available. Observation of the number of samples present in each of the peaks of the synchronisation signal makes it easy to adapt the value of K in order to achieve a desired number of samples per peak. Let the area of each be represented by A (in units of Vcc volts and Tclk seconds). The area for each peak is approximately constant for a given stripe read (for all peaks that separate zero bits). The number of samples taken for each peak will then be:

$$L_{samples} \approx \frac{A}{K}$$

If the number of samples observed for each peak is different from this number, a simple calculation will yield a new value of K:

As mentioned earlier, samples are stored in such a manner that fewer $$K_{new} = K_{old} \cdot \left[\frac{L_{observed}}{L_{desired}}\right]$$

samples are taken at low amplitude, but these samples have a higher resolution. The sample with the shortest sampling period (in terms of ADC clock cycles) is likely to occur at the highest amplitude within a particular region of the signal waveform; it is likely that this point is the peak of a pulse. Unfortunately errors due to quantization and area measurement precision (areas are truncated to integer values) make such a simple method of peak detection inadequate. For this reason, another method must be used.

First, peaks are sought within a region bounded by two zero crossings (baseline crossings). The number of samples in this region is divided by a small constant (e.g. three) to derive a window length for subsequent analysis purposes (length is rounded to an integer). This window length represents the number of samples that will be evaluated as a group to find the voltage peak. The window is applied to the region starting at the first sample and is moved one sample forward in time until the window's upper bound reaches the upper time bound of the region. In each application of the window, the number of clock cycles in all samples is summed. The window position with the shortest duration (least number of clock cycles) is determined to be the position that corresponds to the voltage peak. For this one window position, the sum of the areas in all samples in the window is divided by the length of the window in clock cycles. This effectively yields a value proportional to the average voltage of the samples in the window (weighting longer samples more heavily than shorter samples) which is in turn used as the offset corrected peak voltage. Computation is reduced by only performing the division operation on the one window position that represents the peak. The center of this window (in clock cycles) is chosen as the peak location in time.

Figure 10:
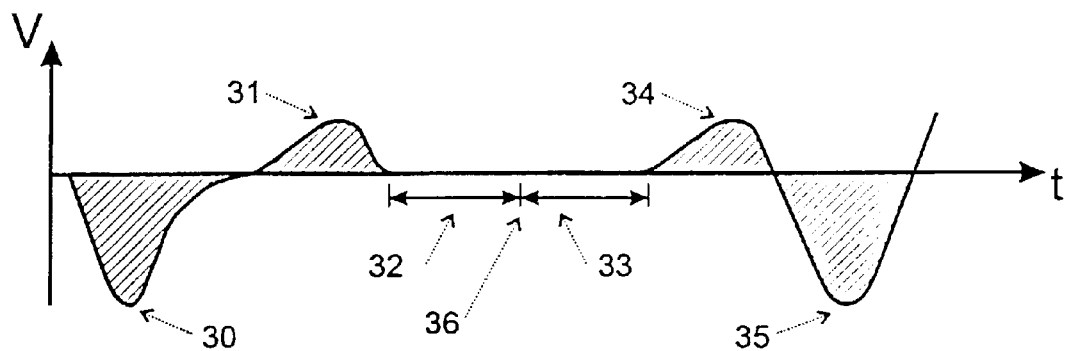
FIG. 10 illustrates an example F/2F signal in the vicinity of a stop event, where a split peak has occurred.

When peaks of the same polarity are found on either side of a stop event, FIG. 10, they are merged into one peak. Peak merging handles the case where a magnetic stripe read is interrupted by a stop event where the magnetic read head gap comes to rest with its gap over top of flux reversal. The location of the merged peak 36 is calculated by locating the half area (from the area/duration samples) point of the merged peaks.

Figure 5:
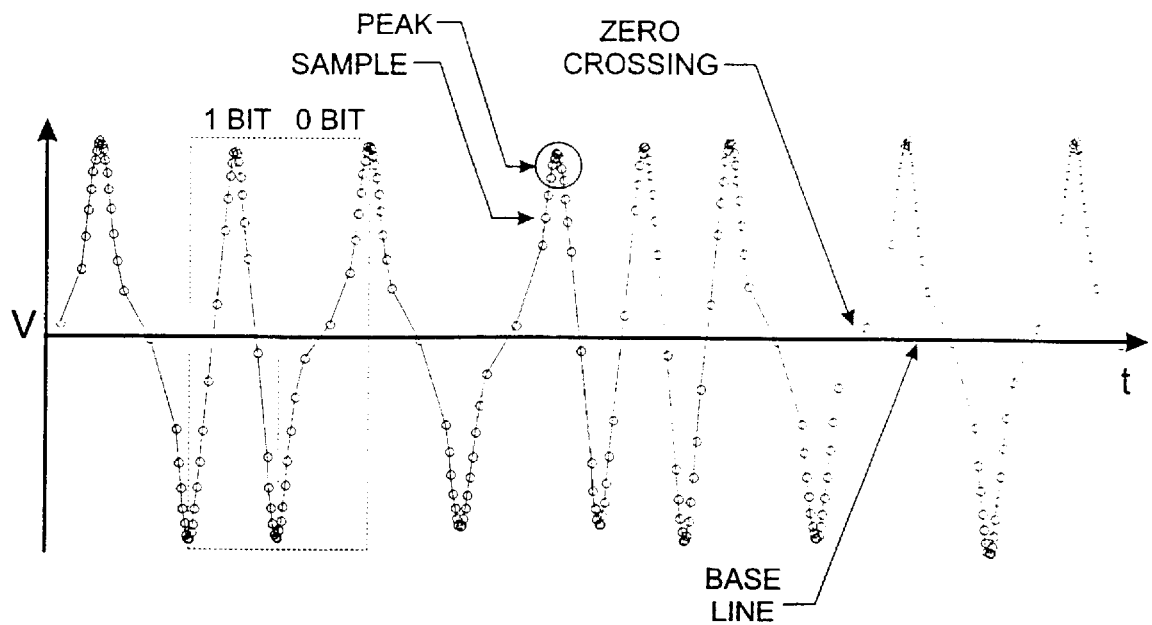
FIG. 5 illustrates a sample F/2F signal waveform as digitized by the analogue to digital converter.

As mentioned earlier, in prior art implementations a good read of a magnetic stripe requires that the stripe is moved across the read head without stopping or reversing and with limited variation in speed. A typical signal expected from such a read is illustrated in FIG. 5.

Figure 6:
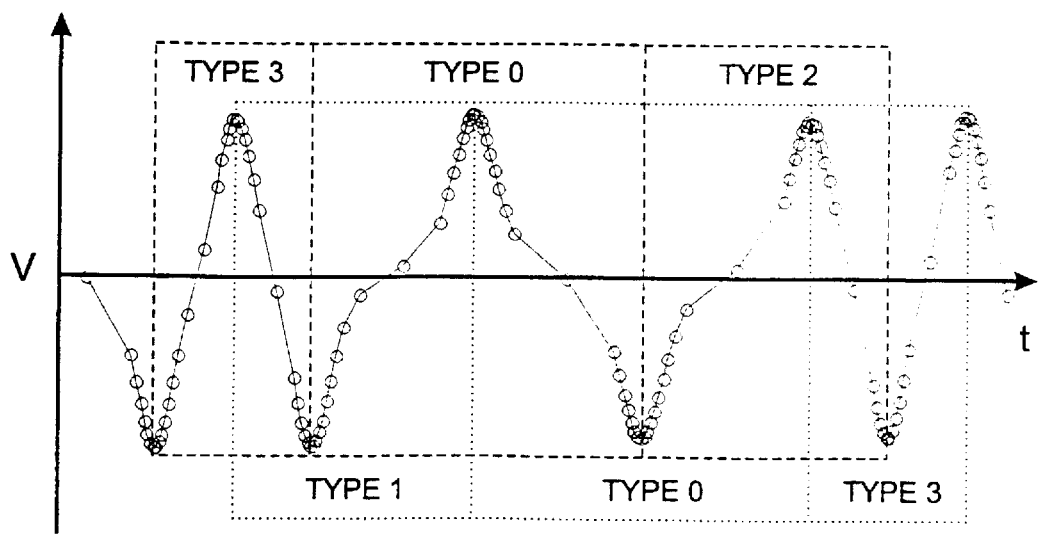
FIG. 6 illustrates a sample F/2F signal waveform with each of the four possible peak classes identified, according to the present invention.

With traditional magnetic stripe reading technologies (prior art) stops, reversal of stripe direction (reversals) and large changes in speed cause reads that ultimately result in an incorrect sequence of binary characters being deduced from the head signal. A novel feature of this invention is its ability to correctly read the stripe when movement is such that it may include changes in velocity, stop events and/or direction reversals. Using the sampling algorithm described previously, various metrics of the peaks can be generated. These metrics are then used to construct a model of bit patterns and of relative movement that are used to carry through further analysis to extract the series of stored characters encoded on the stripe. All metrics extracted from a particular stripe being analysed are compared with either predetermined stored models, or with models adapted from a decision feedback learning system during the read itself. Six peak metrics have been identified. Peaks are classified into four categories based on the relationship between them and the nearest peaks that precede and follow them on the stripe (see FIG. 6).

The peak types are described as follows:

Peak type 0: at the boundary between two zero bits;
Peak type 1: at the boundary preceded by a one bit and followed by a zero bit;
Peak type 2: at the boundary preceded by a zero and followed by a one bit;
Peak type 3: at the boundary between two one bits or in the middle of a one bit.

The peak area (see FIG. 7) is determined by counting the number of samples in a peak of a given polarity with appropriate compensation being made for samples that are maximal length (magnitude of area is not K). Observations of data collected in this manner suggest that peaks occurring on the boundary between two zeros [type 0] have the larger areas than average 20, while peaks occurring in the middle of a one bit 21 (or between two consecutive one bits) [type 3] have smaller areas than average. Peaks at that boundary between a one bit and a zero bit (or vice-versa) [types 1&2] have intermediate areas. This is expected due to spatial inter-flux reversal interference as the magnetic flux from adjacent transitions become superimposed at the read head gap. A larger head gap should increase the magnitude of this effect, making the three peak classes even more distinguishable. Note that factors other than inter-peak interference, magnetic stripe damage or surface contamination for example, can also cause area variations.

Figure 7:
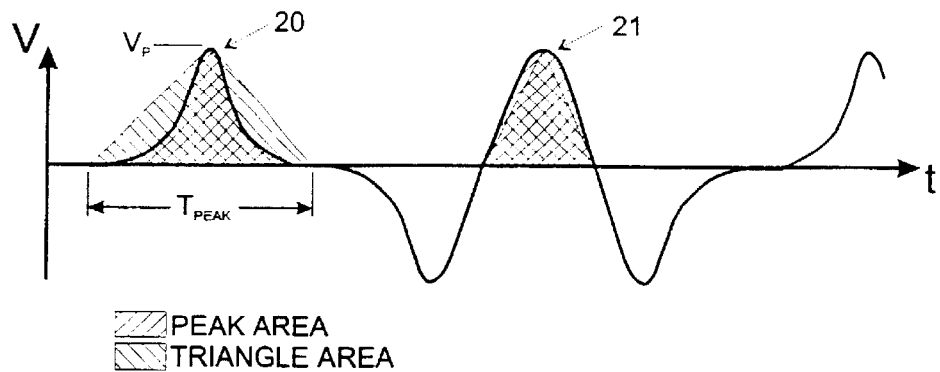
FIG. 7 illustrates both peak area and triangle area of peaks in an example F/2F signal.

The ratio of the area of the peak itself to that of a triangle, the peak triangle, whose base extends from zero-cross to zero-cross and whose height is from the baseline (offset) to the voltage peak can be calculated (FIG. 7).

Experiments have shown that while the absolute area of peaks vary, the shape of the peak depends on the magnetic stripe material, the head gap, and inter-peak interference. It has also been observed that peaks separating two zero bits [type 0] have ratios which are typically less than one, while peaks in the middle of a one bit (or between two one bits) [type 3] have ratios greater than one. Peaks that separate one bits from zero bits, or vice-versa [types 1&2], have ratios that approach one. As with the area metric, larger head gaps are expected to increase the inter-peak interference, again making the three classes of peaks more distinguishable with this area ratio metric.

The position of the voltage peak relative to the peak start zero crossing point and the peak end zero crossing point, referred to as peak time ratio, also provides useful information. Specifically, one can calculate the ratio of the time for a peak reach its full value to the total peak time (FIG. 8):

$$Rpk = \frac{\text{Peak rise time} - \text{Peak start time}}{\text{Peak end time} - \text{Peak start time}}$$

Figure 8:
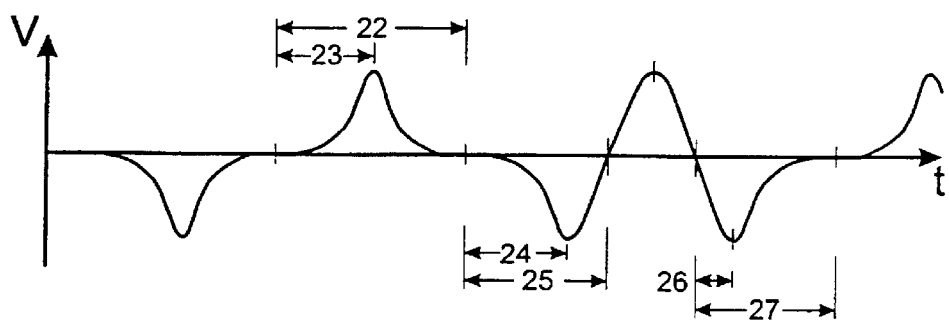
FIG. 8 illustrates times used in the computation of the peak time ratio metric in an example F/2F signal.

Experiments have shown that the peak separating two zero bits has a Rpk of ~0.5 (time 23 divided by time 22 in FIG. 8), while peaks that separate zero bits from one bits have Rpk>0.5 (time 24 divided by time 25 in FIG. 8). Peaks that separate one and zero bits gave Rpk<0.5 (time 26 divided by time 27 in FIG. 8). Note that this metric can also be expressed as using the difference between the areas of the rising and falling parts of the peak divided by the total area.

Peak area ratio, defined as the position of the voltage peak, in terms of area, to the total peak area, provides useful information in a manner similar to the peak time ratio. Specifically, one can calculate the ratio of the area for a peak reach its full value to the total peak area:

$$Rpk = \frac{\text{area from zero cross time to Peak voltage time}}{\text{Total Peak area}}$$

The product of the peak voltage, Vp, (with respect to the base line) and the peak duration, Tpeak, (peak start time–peak end time) represents an area defined by a rectangle (peak rectangular area) with time duration along the horizontal axis and voltage along its vertical (see FIG. 7). Dividing rectangular area by two yields the peak triangle area described earlier. This value is effectively a speed compensated amplitude measurement, where the peaks within a one bit have approximately one half the compensated amplitude of peaks within a zero bit. This is due to the fact that the peak within a one bit has approximately the same voltage amplitude as a peak separating two zero bits at a given velocity, but has half the duration. Again, pulses can be divided into three classes. Peaks separating zero bits have the largest area. Peaks separating one bits or those within a one bit have areas approximately one half of those having the largest areas. Peaks between zero and one bits have values intermediate between the two extremes just described.

Figure 9:
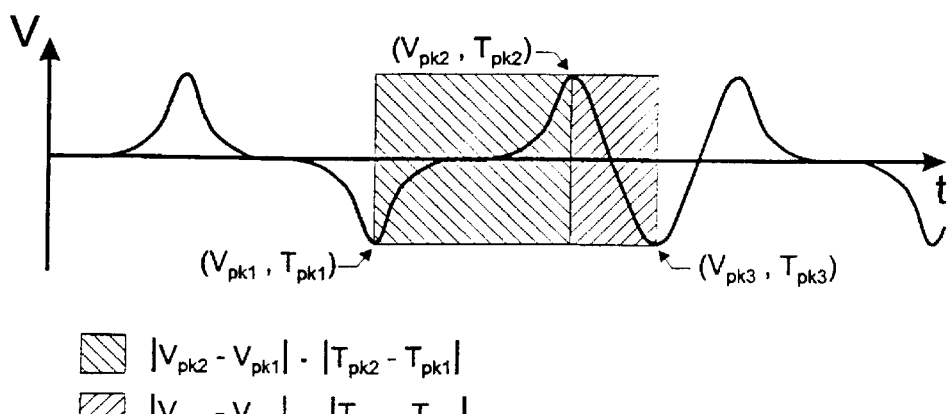
FIG. 9 illustrates areas used in the computation of the peak to peak area metric in an example F/2F signal.

Data from two adjacent peaks can be used to calculate the peak to peak area, defined as the product of the difference between the two peak magnitudes and the time difference between them. Peak to peak areas can be used to determine whether or not the peaks are endpoints of a zero bit, or are either the first or last two peaks of a one bit (FIG. 9). Note that large times between peaks due to stop events are removed prior to calculation of this metric.

Metric computations for merged peaks involve some special considerations. Referring to FIG. 10, the triangle area of the merged peak is equal to the sum of the triangle areas of the original two peaks 31 and 34. The total stopage time (time with maximal length samples—indicated by the sum of times 32 and 33) is factored in the updating of the rest of the metrics. These include: centroid of the merged peak 36; left rectangle area of the merged peak 36; right rectangle area of the merged peak 36; right rectangle area of the left adjacent peak 30; and left rectangle area of the right adjacent peak 35.

Peak classification is the process of generating a score for the confidence that a peak matches each one of four peak class prototypes. The six metric values for the peak in question are compared against each of four peak class prototypes. Peak classification is a process that involves an initial training phase during the beginning of the stripe, followed by a combination of classification of peaks and slow adaptation of the class prototypes during the remainder of the read.

Initial training occurs at the beginning of the stripe read, which on typical magnetic stripes contains a string of zero bits with no parity. In the zero string it is assumed that all the peaks are of Type 0 (those between two zero bits). This fact is used to calculate average values for each of the six peak models. It also permits K to be adjusted to provide a base sampling rate of L samples per peak (see FIG. 4). Since the relationships among model metric values for each peak type are approximately known, initial values for these can be estimated from the metrics of peak type 0. The resulting prototype values are the ones that are initially applied when a new series of peaks is read. In the remainder of the read, prototype values are adaptively refined.

The confidence measure for each peak consists of four sum-squared error (SSE) values, one for each type of peak. The measured value derived using of each of the six models is subtracted from the trained prototype values and the differences squared. The six squared differences are multiplied by weighting factors and summed to yield the SSE. The actual confidence measure used is:
where 'Q' is a small constant, 'i' refers to the peak type (there are four $$Confidence_i = \text{if}(SSE_i < \text{Lim}), \frac{(Q + \min_{\forall i}(SSE_i))}{(Q + SSE_i)}; \text{else}, \frac{(Q + \min_{\forall i}(SSE_i))}{(Q + SSE_i) \cdot G}$$

types), and G is a small integer (typically 2). Q serves to prevent singularities and G forces peaks that match all four prototypes poorly to have their confidences normalized to a maximum less than one. Other functions may be used to measure confidence.

Peaks are classified into types based on the confidence level associated with them. If the confidence for a peak type class is above a threshold for a given peak, the trained prototypes are adapted using an update procedure similar to that used in neural networks:

Value(updated)=Value+(New_value−Value)×Learning_rate, such that the updated value changes by a small amount with each new peak, determined by the learning rate (a fraction between zero and one) and the magnitude of the difference between the prototype value and that derived from the current peak being examined. This method performs a moving average with an exponentially decaying weight over time. Depending on one's field, this method is considered an adaptive system (control and filter theory) or as training/learning (statistics and artificial neural networks). There are two learning rates, one for the prototype to which the peak is believed to match best with, and a lower one for the other three types. Learning applied to prototypes not corresponding to the most confident peak type is done on a percentage change basis. For example, if the most likely peak type is type 0 and the new value of peak area is 75% of the current prototype area for type 0, all other types will be effectively trained on 75% of their current prototype areas. If the two learning rates are equal, the four prototypes will be forced to track each other at their ratios established at the initial training time. A preferred embodiment is to have the learning rate for the most likely peak type be higher than that for the other peak types. This allows the prototypes for the four peak types to deviate from the ratios established at the initial training time at which point the ratios were based upon a priori information. Adaptation permits values to more closely model the peaks from the specific stripe being read.

Other refinements of the classification method include the weighting of each of the metrics in the SSE calculation based upon the proximity of a stop event or other signal impairment. This is done because the utility of metrics varies with conditions of the read. For example, some metrics work well only when no stop events occur. Type classification decisions can be made in a hard (one type only is chosen) or a soft manner (confidence that the peak type is of a given type is considered for each of the possible types). Classification of peaks leads naturally into bit classification.

Other refinements of the classification method include the weighting of each of the metrics in the SSE calculation based upon the proximity of a stop event or other signal impairment. This is done because the utility of the various metrics vary with conditions of the read. For example, some metrics work well only when no stop events occur. Type classification decisions can be made in a hard (one type only is chosen) or a soft manner (confidence that the peak type is of a given type is considered for each of the possible types). Classification of peaks leads naturally into bit classification.

It has been observed that the peak metric prototypes are typically inaccurate immediately after a stop event (stripe motion stops, then continues). This is caused by changes in the mechanical interface between the magnetic head gap and the magnetic stripe. The discontinuity in the forces on the magnetic head before and after the stop event causes a step change in the coupling between the magnetic head and the magnetic stripe, resulting in a changing in the area (volt*sec product) of each peak type. During motion not involving stops, the mechanical changes are gradual, allowing the peak prototypes to adapt. In the event of a stop event, however, the large step change in the metrics of the peaks leads to peak classification errors. After a number of peaks are classified the peak prototypes are typically trained to reasonable values. In order to correct classification errors that occur immediately after a stop event, a peak reverse gap closure algorithm may be applied which:

Looks for a number (Z) high confidence peak classifications after a stop event (e.g. 10 high confidence peaks after a stop)

Re-classifies peaks and trains the peak type prototypes working backwards in time from the $Z^{th}$ high confidence peak towards the peak adjacent to the stop event.

Reclassifies peaks again, working from the peak adjacent to the stop event until either all peaks have been classified or another stop event is detected (start over again at step 1 if another stop event is encountered)

Bits may be classified using two general approaches, one called soft bit classification, the other hard bit classification. Each approach starts with the same input data, a sequence of peak type confidences (4 confidence values for each peak, FIG. 13) and the value of the preceding decoded bit. Each also generates the same type of results, a bit classification ("decoded" bit value) and a bit confidence value which indicates the confidence that the classification is correct.

Figure 12:
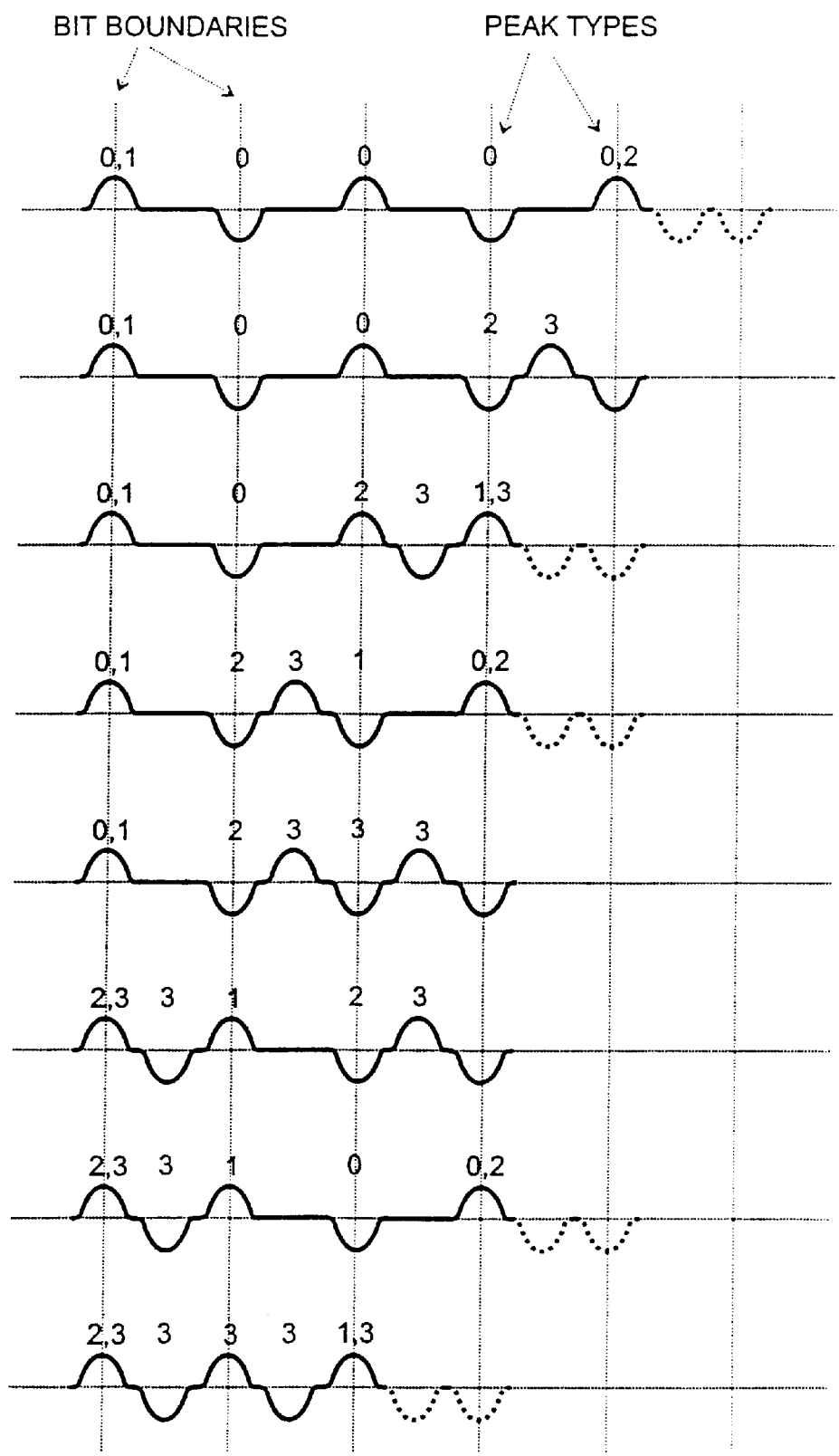
FIG. 12 illustrates all 26 valid class sequences of five peaks that encode F/2F bits, based on the constraint that the first peak is on a bit boundary.
Figure 13:
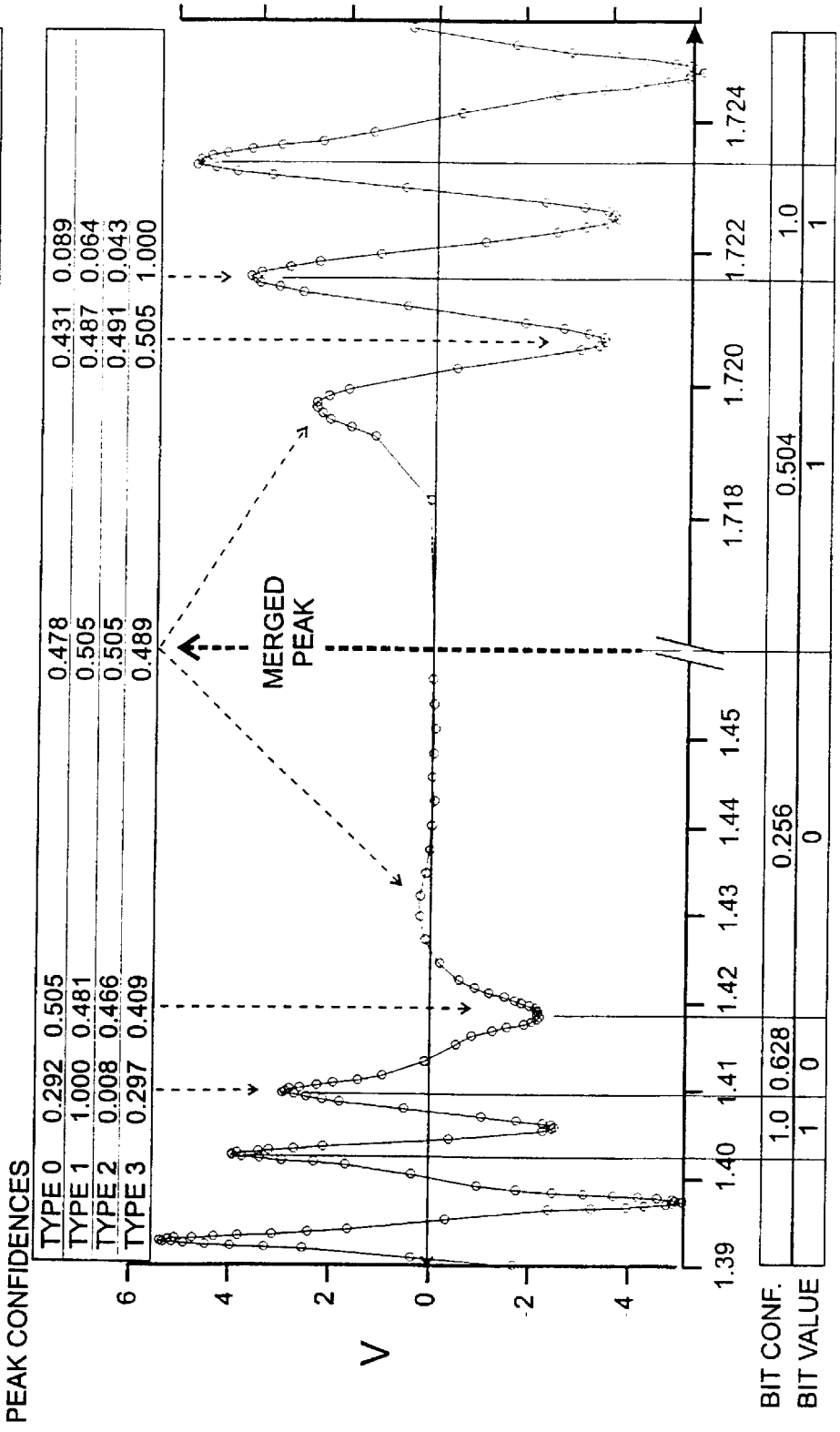
FIG. 13 illustrates the process of soft bit classification on an example F/2F signal in the vicinity of a stop event.

In soft classification all possible interpretations of the N peaks in the window are considered, and the interpretation with the largest total confidence (summed over all the window peaks) is used to decode the first bit in the sequence. The window is then advanced by one bit; this advance may be by either one or two peaks depending upon what the decoded bit was. FIG. 12 illustrates a set of 26 valid peak type sequences for a window of five peaks. The peak type of the first peak is varied depending on what the previous decoded bit was, reducing the set under consideration at any given time to 13. The type of the last peak may or may not depend on the value of a following bit. If, for instance, in a particular sequence the last peak in the window represents the middle of a one bit, then its type will be independent of the value of the following bit. In the event that the type of the last peak in the sequence is dependent on the value of the next bit in the sequence, then both of the two possibilities will be considered. FIG. 13 illustrates sample soft bit classification data in the vicinity of a stop event.

In hard bit classification, peak types within a window of peaks are first made "hard" by classifying each peak as the type that has the maximum confidence measurement associated with it. Next, the Hamming distance between all possible peak class sequences (FIG. 12) and the hard peak types associated with the window of peaks is determined. The first bit of the sequence having the minimum hamming distance is the decoded bit value. The peak window is then advanced by one bit to permit determination of the next bit value. If two sequences are tied for the minimum distance, soft classification may be used to break the tie. Hard classification is computationally efficient.

After a bit value is chosen for the bit position at the start of the current window, a confidence is calculated for the bit based purely on the two (bit value 0) or three (bit value 1) peaks that encode the bit. A convenient measure of the confidence for a bit classification is the average of the confidences for each of the peak types in the selected best matching sequence. For example, if the best matching sequence is selected to be the peak type sequence {2, 3, 1, 0, 0}, then the decoded bit value will be 1. The confidence of this bit value will be equal to the average of the confidences that the first peak is type 2, the second peak is type 3 and the third peak is type 1. Other functions of peak confidences may be used to calculate bit confidences, geometric mean for instance.

The decoding process can lose synchronisation with the stripe's bit sequence; this is usually detected by noting a character coding violation (for instance a sequence of the peak types 2, 1, 0 is invalid). In this situation, confidence measures will be low. It is possible to work back through the peak sequence (reverse gap closure at the bit level) and determine the location at which loss of synchronisation occurred. This permits the peak sequence to be re-interpreted to remove the error. In a manner similar to a reverse gap closure at the peak level, bits may be interpreted in reverse time order from high confidence bits after the stop event until the stop event or region of signal impairment is reached.

At the point where the vicinity of the stop event or other signal impairment has been reached (low confidence peak classifications), a low confidence region may be defined. This low confidence region starts with the last peak of the last high confidence bit before the stop event and ends with the first peak of the first high confidence bit following the stop event. Evaluation of the peaks in the low confidence region may then be repeated using the starting and ending peaks as constraints. When the peak sequence is decoded in a manner similar to bit classification described earlier, only sequences which meet the constraint of both having both the starting and the ending peaks on a bit boundary will be considered. If, for example, there are four peaks in this low confidence region (one at the start and on a bit boundary, two in the middle of the low confidence region, and an ending peak also on a bit boundary), the peak sequence can be decoded as being '000', '01', or '10'. The bit sequence '11' is not possible because the last of the four peaks would fall in the middle of the last one bit, which is not on a bit boundary.

When a stop event or other signal impairment occurs, there is a bit string leading up to the impairment location and one leading away from it. In the vicinity of the impairment, confidence measurements on bits are low. Assuming that a reversal in stripe direction has not occurred, low confidence is due to high stripe-head acceleration, low signal amplitude or a missed peak due to stripe damage. In this event it is possible that the wrong number of bits may be decoded initially (e.g. '00' may be read as '1' or '1' as '00' etc.). Detection of this type of decoding error may be performed by observing character level bit alignment in the bit strings before and after the stop event. Typical magnetic stripes (American Bankers Association (ABA) standard, International Air Transport Association (IATA) standard) group bits in the stripe into characters, with one of the bits being a parity bit to allow character level error detection. Any decoding error within a region with an impairment which results in an increase or decrease in the number of bits being decoded will result in the alignment of the characters in the two bit strings being different. By scoring the confidence for the character alignment in each bit string for each of the possibilities (one alignment position for each bit in a character), the likelihood of a decoding error may be determined.

By determining the offset between the character alignments of the two bit strings (constrained to be +/− one half of a character) based on the most confident alignment in each bit string, the region of low confidence (area of signal impairment) may be reclassified in a similar way to that outlined in reverse gap closure at the bit level. The shift in character alignment is assumed to be due to the erroneous addition, or deletion, of bits in the low confidence region. A constrained re-evaluation is performed on the peaks in the low confidence region. The constraints are the newly discovered number of bits to be decoded (typically only one more, or one less, than was originally decoded), and the bounding peaks (before and after low confidence region) which are located at bit boundaries. An evaluation of all possible sequences that satisfy these constraints using either hard or soft bit classification is then performed to extract the bit sequence that is most likely, along with corresponding confidence measures in the low confidence region. Note that this method does not work well for short bit strings that contain few characters. In this case the analysis must be performed on either side of two or more signal impairments.

Another form of constrained analysis called motion fitting may be used in regions of low bit confidence. In this case all peaks in the low confidence region, along with a number of high confidence peaks on either side of the low confidence region, are used. Using the peak times, a mathematical stripe motion model is generated to fit the required stripe motion in order for the received sequence of peaks to have arrived at the read head at the corresponding peak times. This procedure is repeated for all legal sequences of peak classes in the low confidence region. These hypothetical motion models are then scored for plausibility. For example, one would reduce scores for motion that contains rapid changes in velocity (penalise large high order derivatives) based on acceleration measures. In addition, use of peak data gathered simultaneously from other tracks of data present on the same stripe (there are up to three in total in some applications) allows correlation of these motion models to be used to assist in plausibility evaluation (all of the tracks on the stripe should be moving at the same velocity). This technique is of particular use where a signal impairment on one track is not correlated with a signal impairment on another. In this case, high confidence peak data from one track is used to generate a stripe motion model which is then used to assist in determining the number of bits in the other track's low confidence region and assist with decoding them. Near stop events stripe motion modelling is particularly useful and the low velocities associated with these events afford the processing time that is required.

Bit sequences are analysed to detect reversal events. These events are detected in several ways that include comparing the total number of bits obtained from the analysis with an expected total number of bits. When the former exceeds the latter, a reversal event has occurred. The determination that a reversal may have occurred may also both be made and confirmed through the analysis of the reverse time correlation between bit strings before and after stop events.

Figure 11:
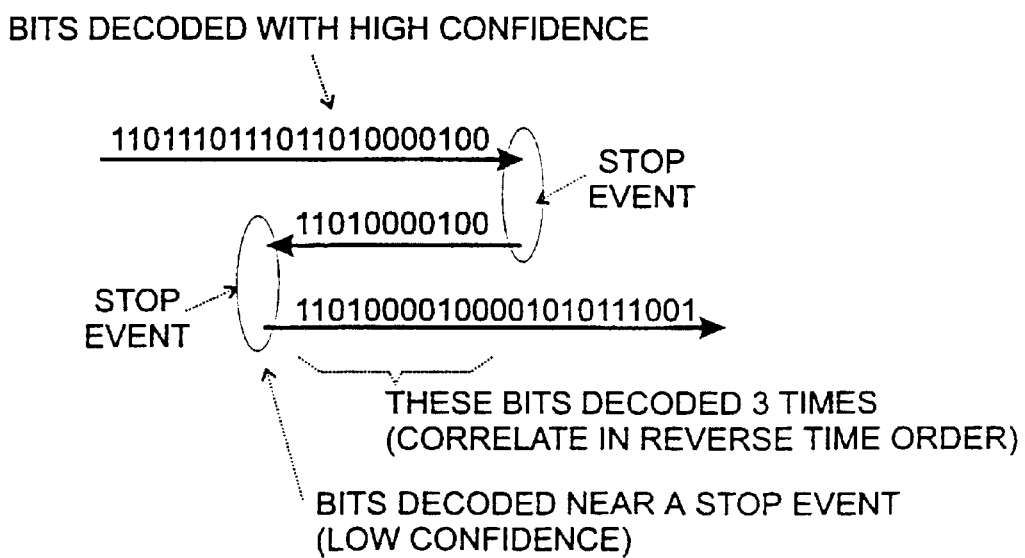
FIG. 11 illustrates an example of the bit sequences arising from a reversal event.

During a typical reversal, three overlapping sequences of peaks, and consequently bit sequences (FIG. 11), are created as the stripe changes direction twice (forward-backward, and backward-forward). The overlap contributes redundant information that can be used to advantage to mitigate the low bit classification confidence values in the vicinity of the two stops created at the turn-around points. Although the same models and analyses that are used in the vicinity of stops can be applied, the task is simplified because the peak sequence can be reconstructed without having to decode and rely on the lowest confidence peaks around the stops.

When many stop events are present, particularly when they are close together, the resultant bit sequences may be too short for reverse time sequence correlation to be useful. The number of potential locations that require analysis for potential direction reversals may become quite large. Most magnetic stripe applications allow for a bounded number of bits to be encoded on the stripe. By assuming that the first and last bit sequences read are in the "forward" direction, all possible combinations of direction reversals may be examined for plausibility by adding or subtracting in all possible permutations their bit lengths to the first and last bit sequence lengths and comparing to the bound on the number of expected bits. The plausible combinations may be tested through standard high level (character based) decoding and error detection to determine which case actually occurred.

Since various modifications can be made in our invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A method for decoding an analogue signal having a series of sequential peaks comprising:
    using an analogue to digital converter to sample the analogue voltage signal for generating a plurality of sequential digital values from a sample of the analogue voltage signal at a predetermined sampling rate;
    and varying the sampling rate such that the sampling rate is increased at points along the signal and decreased at other points along the signal in dependence upon characteristics of the analogue voltage signal.

2. The method according to claim 1 wherein the sampling rate is proportional to an amplitude of the signal from an average value of the signal such that the rate is increased where the amplitude is higher and reduced where the amplitude is lower.

3. The method according to claim 2 wherein an average value of the signal is obtained by a low pass filter and the average value is subtracted from the signal to provide a resultant signal wherein the resultant signal is integrated over time to provide an area and wherein a sample is taken when the area reaches a predetermined threshold such that the areas defined by the samples are substantially equal.

4. The method according to claim 3 wherein a sample is taken after a predetermined time period in the event that the area fails to reach the predetermined threshold within the predetermined time period.

5. The method according to claim 3 wherein the peaks are detected in the signal by:
    generating a series of sequences of area-duration samples which are delineated according to their polarity (positive or negative areas);
    discarding those sequences of the series that do not consist of at least a certain minimum number of samples;
    for each sequence, considering all sub-sequences that are of some fraction (>=1/M) of the length of the entire sequence;
    and examining the total duration of each of these sub-sequences in order to find the sub-sequence with the shortest total duration where this sub-sequence is taken as being representative of the location of the peak and its amplitude.

6. The method according to claim 1 wherein the analogue signal is generated by causing relative movement between a card having a magnetic stripe with changes in magnetization at positions along the length of the stripe and a sensor head where pulses at a first frequency designate a first bit and pulses at a second frequency designate a second bit.

7. The method according to claim 6 wherein a start of a magnetic stripe read is detected through the consecutive occurrence of a predetermined number of samples which are of less than said predetermined time period.

8. The method according to claim 6 wherein a stop event caused by a temporary stop in said relative movement is detected through the consecutive occurrence of a predetermined number of samples which are of said predetermined time period.

9. The method according to claim 1 including:
    detecting a series of the peaks in the signal each having a peak profile;
    defining a plurality of peak classifications each having a peak model;
    and using a plurality of measurement criteria for comparing each detected peak profile in turn with each of the peak models to determine which of the peak classifications is most likely for the peak.

10. The method according to claim 9 wherein the criteria are selected from the following:
    a) peak area
    b) ratio of peak area to the area of the peak triangle
    c) peak time ratio
    d) peak area ratio
    e) peak rectangular area
    f) peak to peak area
    g) time of occurrence of three or more peaks.

11. The method according to claim 9 wherein each peak is given a confidence factor for each peak classification based upon the criteria.

12. The method according to claim 9 wherein, for those peaks having a confidence factor for a peak classification greater than a predetermined value, the samples are discarded from memory.

13. The method according to claim 9 wherein the analogue signal is generated by causing relative movement between a magnetic stripe with changes in magnetization at positions along the length of the stripe and a sensor head where pulses at a first frequency designate a zero bit and pulses at a second frequency designate a one bit and wherein there are four peak classification as follows:

peak type 0: at the boundary between two zero bits peak type 1: at the boundary between a one and a zero bit peak type 2: at the boundary between a zero and a one bit peak type 3: at the boundary between two one bits or in the middle of a one bit.

14. The method according to claim 13 wherein the peaks are decoded into bits by considering all possible legal sequences of peak classes over a specific window of peaks.

15. The method according to claim 14 wherein the decoding starts with the assumption that the first peak is on a bit boundary and uses the previously decoded bit value as a constraint.

16. The method according to claim 14 wherein the actual sequence of peaks is considered through the creation of the sum of the confidences that each peak matches the corresponding peak class in the sequence wherein the confidence of a match with all possible sequences is computed, and the sequence with the highest confidence is selected.

17. The method according to claim 14 wherein the decoding is carried out by assigning each peak a single class number corresponding to the class with the highest confidence and evaluating matches with the actual peak class sequence by generating a hamming distance between the peak class sequence and all of the legal sequences.

18. The method according to claim 14 wherein the decoding is carried out by re-evaluating the peaks in a low confidence region where only peak sequences which both start and end on a bit cell boundary are considered.

19. The method according to claim 9 wherein the peak models are modified in response to comparison with peak profiles of high confidence factor.

20. The method according to claim 19 wherein the models for the other classes of low probability are also modified at the same time, but with targets calculated from both the peak values and the current interrelations between the best match class model and the class model being modified.

21. The method according to claim 1 wherein the analogue signal is generated by causing relative movement having one or more stop events between a magnetic stripe with changes in magnetization at positions along the length of the stripe and a sensor head where pulses at a first frequency designate a zero bit and pulses at a second frequency designate a one bit and wherein adjacent peaks of the same polarity that are separated by a stop event are merged together.

22. The method according to claim 1 wherein the analogue signal is generated by causing relative movement between a magnetic stripe with changes in magnetization at positions along the length of the stripe and a sensor head where pulses at a first frequency designate a zero bit and pulses at a second frequency designate a one bit, wherein the bits are arranged in groups with an associated parity bit, wherein a decoded sequence of bits is divided into a group containing bits that have been decoded with high confidence where the group is separated from other groups by groups of bits that have been decoded with relatively low confidence, and wherein the method includes the following steps:

examining each of the high confidence bit groups to identify the group boundaries, examining the legal alignments in the group before and after a low confidence group, detecting within the low confidence group, if the alignment is not maintained, an alignment error caused by decoding either a greater or smaller number of bits than the correct number, and re-classified the peaks in the region with the further constraint that a known number of bits are to be decoded.

23. The method according to claim 1 wherein the analogue signal is generated by causing relative movement between a sensor head and a magnetic stripe with changes in magnetization at positions along the length of the stripe to define information recorded on the stripe, wherein the analogue signal includes one or more anomalies each generated by a stop event in the relative movement, wherein the samples of the signal are used to decode pieces of the information where the pieces of information are given confidence factors based upon comparison with a model of the information, wherein the models are modified based upon the comparisons and wherein, in the event that the confidence factors fall significantly at an anomaly caused by a stop event, comparisons through the signal are continued until the confidence factors increase to a level above a threshold whereupon the comparisons are reversed through the signal back to the anomaly while re-modifying the models.

24. The method according to claim 1 wherein the analogue signal is generated by causing relative movement between a sensor head and a card having a magnetic stripe with changes in magnetization at positions along the length of the stripe to define information recorded on the stripe, wherein the samples are used to decode the information, wherein the relative movement includes a temporary reverse in the direction of relative movement separated by two stop events and wherein a portion of the signal between the two stop events is compared in reverse to two portions of the signal each on a respective side of the stop events to cancel duplicate information caused by the reversal and to obtain enhanced decoding of the information at the two stop events.

25. A method for decoding an analogue signal having a series of sequential peaks comprising:

detecting a series of the peaks in the signal each having a peak profile;

defining a plurality of peak classifications each having a peak model;

and using a plurality of measurement criteria for comparing each detected peak profile in turn with each of the peak models to determine which of the peak classifications is most likely for the peak.

26. The method according to claim 25 wherein the criteria are selected from the following:

a) peak area b) ratio of peak area to the area of the peak triangle c) peak time ratio d) peak area ratio e) peak rectangular area f) peak to peak area g) time of occurrence of three or more peaks.

27. The method according to claim 25 wherein each peak is given a confidence factor for each peak classification based upon the criteria.

28. The method according to claim 25 wherein, for those peaks having a confidence factor for a peak classification greater than a predetermined value, the samples are discarded from memory.

29. The method according to claim 25 wherein the analogue signal is generated by causing relative movement between a magnetic stripe with changes in magnetization at positions along the length of the stripe and a sensor head where pulses at a first frequency designate a zero bit and pulses at a second frequency designate a one bit and wherein there are four peak classification as follows:

peak type 0: at the boundary between two zero bits peak type 1: at the boundary between a one and a zero bit peak type 2: at the boundary between a zero and a one bit peak type 3: at the boundary between two one bits or in the middle of a one bit.

30. The method according to claim 25 wherein the peak models are modified in response to comparison with peak profiles of high confidence factor.

31. The method according to claim 30 wherein the models for the other classes of low probability are also modified at the same time, but with targets calculated from both the peak values and the current interrelations between the best match class model and the class model being modified.

32. A method for decoding an analogue signal comprising:

generating the analogue signal by causing relative movement between a magnetic stripe with changes in magnetization at positions along the length of the stripe and a sensor head where pulses at a first frequency designate a zero bit and pulses at a second frequency designate a one bit;

wherein the bits are arranged in groups with an associated parity bit, wherein a decoded sequence of bits is divided into a group containing bits that have been decoded with high confidence where the group is separated from other groups by groups of bits that have been decoded with relatively low confidence;

examining each of the high confidence bit groups to identify the group boundaries, examining the legal alignments in the group before and after a low confidence group, detecting within the low confidence group, if the alignment is not maintained, an alignment error caused by decoding either a greater or smaller number of bits than the correct number, and re-classified the peaks in the region with the further constraint that a known number of bits are to be decoded.

33. A method for decoding an analogue signal comprising:

generating the analogue signal by causing relative movement between a sensor head and a magnetic stripe with changes in magnetization at positions along the length of the stripe to define information recorded on the stripe;

wherein the analogue signal includes one or more anomalies each generated by a stop event in the relative movement;

wherein samples of the signal are used to decode pieces of the information where the pieces of information are given confidence factors based upon comparison with a model of the information;

wherein the models are modified based upon the comparisons;

and wherein, in the event that the confidence factors fall significantly at an anomaly caused by a stop event, comparisons through the signal are continued until the confidence factors increase to a level above a threshold whereupon the comparisons are reversed through the signal back to the anomaly while re-modifying the models.

34. A method for decoding an analogue signal comprising:

generating the analogue signal by causing relative movement between a sensor head and a magnetic stripe with changes in magnetization at positions along the length of the stripe to define information recorded on the stripe;

wherein samples of the signal are used to decode the information;

wherein the relative movement includes a temporary reverse in the direction of relative movement separated by two stop events;

and wherein a portion of the signal between the two stop events is compared in reverse to two portions of the signal each on a respective side of the stop events to cancel duplicate information caused by the reversal and to obtain enhanced decoding of the information at the two stop events.

* * * * *